United States Patent [19]
Zaborsky et al.

[11] 3,994,530
[45] Nov. 30, 1976

[54] ENGINE EXHAUST DIVERTER VALVE

[75] Inventors: George Zaborsky, Westchester; Ralph S. Hajek, Villa Park, both of Ill.

[73] Assignee: International Harvester Company, Chicago, Ill.

[22] Filed: Dec. 8, 1975

[21] Appl. No.: 638,410

[52] U.S. Cl............................ 298/1 H; 137/612.1; 137/625.49
[51] Int. Cl.² ............................................ B60P 1/00
[58] Field of Search ....... 298/1 H; 137/609, 625.49, 137/610, 612.1, 625.5

[56] References Cited
UNITED STATES PATENTS

| 3,039,493 | 6/1962 | Licari | 298/1 H |
| 3,664,706 | 5/1972 | Chant | 298/1 H |

FOREIGN PATENTS OR APPLICATIONS

| 1,130,657 | 10/1956 | France | 137/625.47 |

Primary Examiner—Robert J. Spar
Assistant Examiner—George F. Abraham
Attorney, Agent, or Firm—Douglas W. Rudy; Floyd B. Harman

[57] ABSTRACT

Valve mechanism allows exhaust gas flow to be directed to either a dump body heating system or an exhaust pipe depending on the proximity of the dump body heating system.

4 Claims, 3 Drawing Figures

ENGINE EXHAUST DIVERTER VALVE

BACKGROUND OF THE INVENTION

1. Field of the Invention

This invention relates to dump trucks having means to heat the dump body.

More specifically, this invention relates to engine exhaust diverter valves which direct engine exhaust gases to a header surrounding the dump body of the dump truck or, depending upon the position of the dump body in respect to the valve, directs the engine exhaust gases to an exhaust pipe.

2. Description of the Prior Art

In the design of heavy duty off highway dump trucks it has been found to be advantageous to heat the dump body in order to prevent the load from freezing to the dump body which, of course, hampers the unloading of the dump body. Heating the dump body also effectively aids in the release of cohesive material such as wet clay, muck and coral rock.

Heating of the dump body has been accomplished through the use of the engine exhaust gases passing through a manifold formed integrally with the dump body. However, a problem is encountered in effecting this method of dump body heating as the dump body will be lifted away during a dumping cycle from the exhaust system of the engine in most cases. With this break in the exhaust system the exhaust gases and particulates are discharged in proximity to the air intake filters and the vehicle cab. This exhaust emission has a tendency to be drawn into the air cleaners and causes premature blocking of them. Additionally, the presence of these exhaust emissions make the cab somewhat uncomfortable.

Thus valving systems have been developed which direct the exhaust gas away from the engine in the cab. Typically these systems are so-called flapper valves which have a linkage associated therewith to position the valve to direct the flow of exhaust gases. The linkage system requires occasional adjustment and maintenance in order to operate properly.

The assignee of this invention has used a valve having a plate biased between a circular exhaust orifice and a concentric cylindrical port concentric with the exhaust orifice such that the plate was biased by internal springs between a position blocking the concentric cylindrical port when the dump body was down and a position blocking the circular exhaust orifice when the dump body was in a dumping attitude. The springs resided in the path of the flow of the hot gases and were thus subject to yielding after long term exposure to said heat.

The invention disclosed herein overcomes difficulties with prior art structures by providing a self-adjusting valve having no bothersome linkages and no parts which would be effected by heat of the exhaust gases.

SUMMARY OF THE INVENTION

This invention is concerned with the control of exhaust gas flow with a diverter valve. The diverter valve preferences the flow of exhaust gases from the manifold inlet of the heating conduit of the dump body structure to an exhaust pipe when the dump body is in a dumping position. The valve is activated by pressure of the dump body on top of the valve displacing a sealing disk thus allowing exhaust gases to pass from the exhaust manifold of the engine to the heating conduits of the dump body. When the dump body is raised, an external spring positions the sealing disk to prevent flow through the valve to the atmosphere while a second valve or exhaust sleeve simultaneously opens to allow exhaust gases to flow from the valve to an exhaust pipe.

An object of this invention is to provide an exhaust diverter valve which can divert the exhaust gases away from the host vehicle cab when the dump body is in an elevated position and can allow exhaust gases to pass into the dump body when the dump body is in the normal or down position.

Another object of this invention is to provide an exhaust diverter valve that has no linkage or internal springs that can be effected by engine exhaust heat.

Various other objects and advantages will appear from the following description of one embodiment of the invention, and the novel features will be particularly pointed out hereinafter in connection with the appended claims.

DESCRIPTION OF THE PREFERRED EMBODIMENTS

Figure 1:
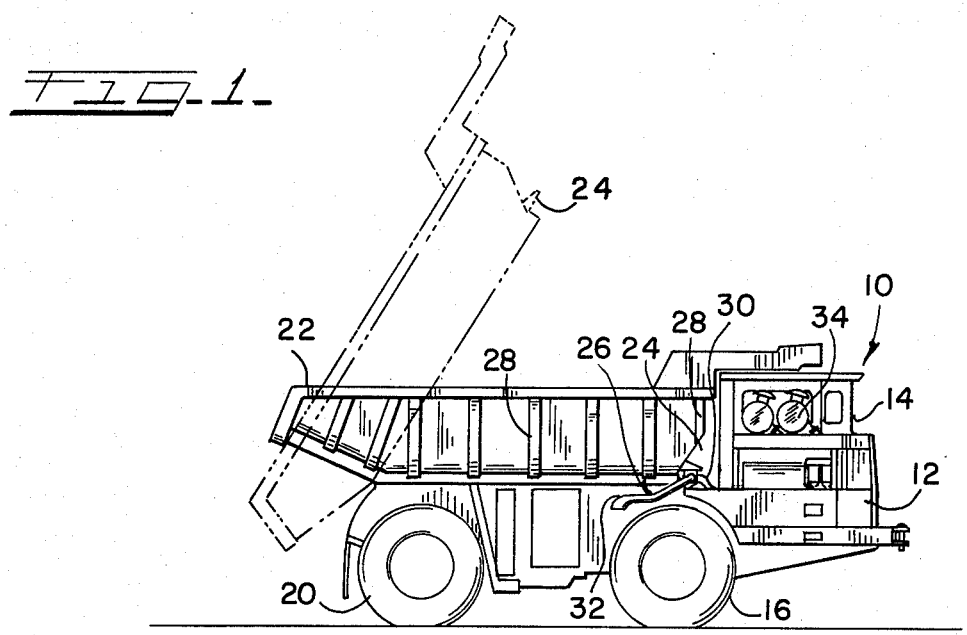
FIG. 1 is a side elevation view of a dump truck incorporating the subject invention.

The location of the Engine Exhaust Diverter Valve of this invention is shown in FIG. 1 where there is presented a dump truck generally 10 of the type used for off highway operations such as road construction and mining. The truck 10 is equipped with a chassis 12, including an operator's compartment or cab 14 as well as forward and rear axles having tires mounted thereto 16 and 20 respectively. An engine and drive means is not specifically pointed out. The engine resides forward of the front axle in an area at the front of the vehicle shared by the cab pivotally mounted on the chassis 12 as a dump body 22 which is shown in a dumping position by the broken line view. Mounted to the forward wall of the dump body 22 is a collector 24. This collector will be positioned above and in contact with the diverter valve generally 26 when the dump body 22 is in its normal horizontal position as shown in FIG. 1.

Also shown in FIG. 1 are an engine exhaust manifold 30 which begins at the engine and terminates at the diverter valve 26 and an exhaust pipe 32 which begins at the diverter valve 24 and terminates at a point distant from the cab 14. A pair of air cleaners, one designated as 34 are carried in proximity of the cab above the vehicle engine.

Figure 2:
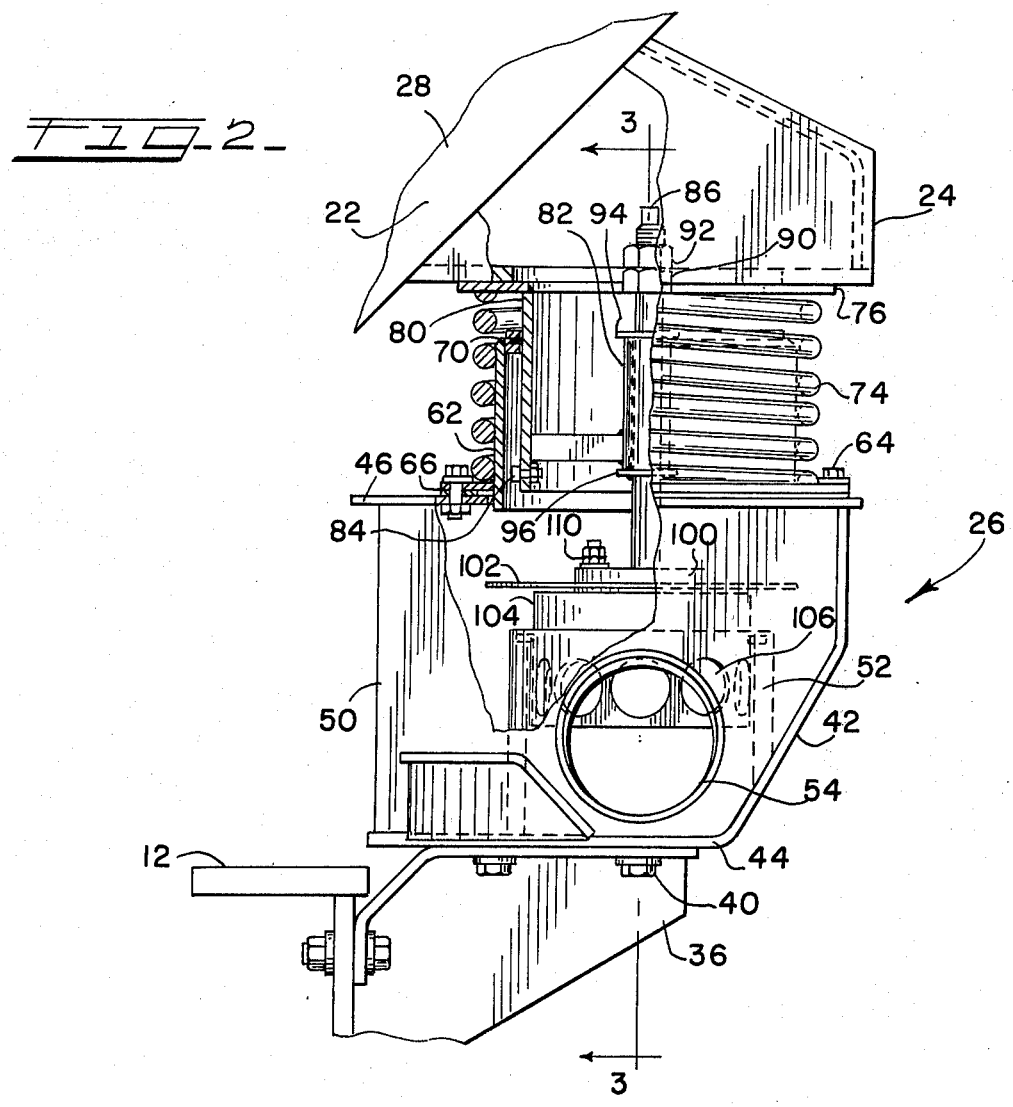
FIG. 2 is an elevation view of the valve of this invention in a normal position.
Figure 3:
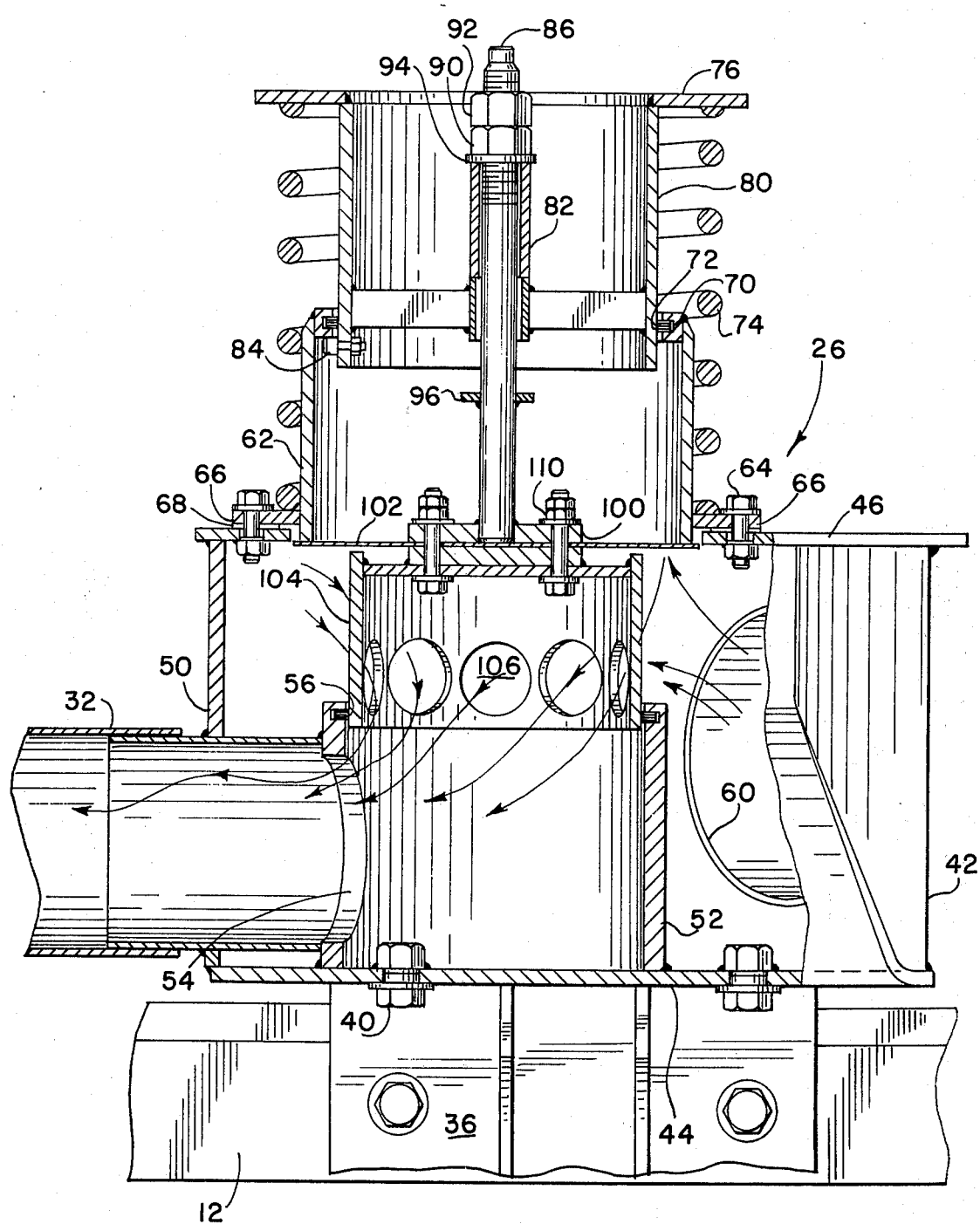
FIG. 3 is a cross sectional view of the subject invention taken through plane 3—3 of FIG. 2 with the valve expanded into a position corresponding to a dumping position.

Looking now at FIGS. 2 and 3 wherein like numerals designate like parts, the exhaust diverter valve is clearly shown. The exhaust diverter valve generally 26 is shown mounted to the chassis 12 of the vehicle by means of a mounting bracket 36. The valve is fastened to this bracket 36 by fasteners such as bolts 40 shown.

FIG. 2 shows a portion of the dump body 22 which supports the collector 24 and FIG. 3 shows a portion of the exhaust pipe 32.

The valve itself as shown in both FIGS. 2 and 3 comprises a chamber 42 having a base portion 44 and a top plate 46 supported by side walls 50. Mounted to the base 44 inside the chamber 42 is a sleeve receiving cylinder 52 which is equipped with an exhaust aperture 54 to which an exhaust pipe 32 is concentrically mounted to ensure that gases will flow through the exhaust aperture 54 into the tailpipe 32. The upper inner surface of the sleeve receiving cylinder may have a recess in which a sealing ring 56 is carried.

Additionally, at least one inlet port 60 is provided in the chamber 42 to allow the entry of exhaust gases from the exhaust manifold 30 of the engine.

The top plate 46 has a large opening therein into which a ring top tube 62 may be retained. A series of fasteners 64 pass through apertures in a lower flange 66 thence through apertures in the top plate 46 in order to hold the ring top tube 62 in place. A gasket 68 may be provided between a top plate 46 and the lower flange 66. The ring top tube may be equipped with a ledge 70 having a sealing means 72 which also acts as a tube stop.

The moving parts of the diverter valve include a biasing means or spring 74 mounted between the flange 66 of the ring top tube 62 and a landing flange 76 integral with a seal ring 80 which is capable of moving inside the ring top tube 62 in a telescoping manner. Supported inside the cylindrical shaped seal ring 80 is an alignment tube 82 which serves a two-fold function as an alignment device and as one component of a lost motion device. Carried on the bottom edge of the seal ring 80 is a seal ring stop 84 which may interfere with the ledge 70 previously mentioned to prevent the seal ring 80 from being urged out of the ring top tube 62.

Carried inside the alignment tube 82 is a sleeve stem 86 having a threaded upper end onto which a second nut 90 and a first nut 92 threadably secure a washer 94. Carried midway down the length of the sleeve stem 86 is a shelf 96 which serves as the final component of the lost motion device utilized in the invention. A flanged apertured lower portion 100 is carried on a lower end of the sleeve stem 86.

A sealing disk 102 and an exhaust sleeve 104 having ports 106 are attached to the flanged portion 100 by fasteners such as 110. The sealing disk 102 is large enough to fit over the opening in the lower portion of the ring top tube 62 thus preventing gas flow through the ring top tube and the seal ring 80. The exhaust sleeve 104 has an outside diameter approximating the inside diameter sleeve receiving cylinder but is slidable therein.

OPERATION OF THE INVENTION

The operation of the engine exhaust diverter valve is extremely simple yet effective as has probably been deduced from the foregoing figures. A cycle in the operation of the valve will be explained. Assume the dump body 22 in a normal position as in the solid line view of FIG. 1. This results in the component relationship shown in FIG. 2.

In the normal position the flow of exhaust gases is directed from the valve to the dump body. The collector 24 has contacted the landing flange 76 of the seal ring 80 and consequently the seal ring has been urged into the ring top tube 62 in a telescoping manner. The sleeve stem 86 has also been disposed downward through the action of the alignment tube 82 on the ledge 96, thus causing the sealing disk 102 to be unseated from the lower opening of the ring top tube 62 as well as causing the exhaust sleeve 104 to be urged into the sleeve receiving cylinder 52 such that ports 106 are closed to the inside of chamber 42. Note that the spring 74 has been compressed.

In this normal position a first flow route of exhaust gases is possible from the vehicle engine into the chamber of the valve and out the top of the valve (through the telescoped together ring top tube and seal ring) into the collector 24 which leads to the distribution manifold 28 on the dump body. The dump body is thus heated by the hot engine gases circulating in the manifold 28 strategically disposed around the dump body thus preventing the freezing or sticking of the cargo in the body and allowing easier dumping thereof.

A second flow path of the exhaust gases is utilized when the dump body is being dumped. This is necessary to prevent the discharge of bothersome exhaust smoke in the proximity of the cab and air filters.

FIG. 3 shows the valve in the position it assumes when the load is being dumped. As the collector 24 has been lifted away from the landing flange 76 the seal ring 80 will be biased upwards by the spring 74 until the seal ring stop 84 comes in contact with the ledge 70. As the seal ring 80 progresses upward the alignment tube 82, via the washer 94, will contact the second nut 90 thus causing the sleeve stem 86 and the apparatus attached to it to be lifted upward with the seal ring.

This upward movement of the seal ring and the sleeve stem 86 causes the sealing disk 102 to seal off the opening at the bottom of the ring top tube 62. Simultaneously, the exhaust sleeve 104 is being pulled out of the sleeve receiving cylinder 52 allowing ports 106 to be exposed which allow gas flow to the exhaust pipe 32 through exhaust aperture 54. Notice that the second route of flow is from the inlet port 60 through ports 106 of the exhaust sleeve 104 through the receiving cylinder 54 to the pipe 32.

When the dump body returns to its normal position the collector 24 lands on the landing surface 76 of the seal ring 80. At this point the lost motion device of the alignment tube 82 and the shelf 96 comes into play. The seal ring 80 in the alignment tube 82 can travel downward some distance before the valving is effected. This is desirable in order to ensure a good seal between the collector and a landing flange 76 before allowing gas to flow in the first path of flow. When the lower part of the alignment tube contacts the shelf 96 displacement of the valving means (meaning the sealing disk 102 and the exhaust sleeve 104) commences. When the dump body has fully landed on the chassis then the path of exhaust gas flow is from the engine to the dump body distribution manifold 28.

Note that the dump body distribution manifold eventually vents to the atmosphere at the rear of the dump body.

It can be appreciated that the telescoping ability of the seal ring 80 allows a tolerable amount of dump body movement in a vertical plane before exhaust gas will be directed to the exhaust pipe. Spring 74 assures that the seal ring 80 will be in contact with the collector 24 as long as it is within range. Once the collector gets out of range the second path of flow will be opened.

Thus it is apparent that there has been provided an effective engine exhaust diverter valve that fulfills the objects of this invention by not having any external linkage and by not having any internal parts that can be affected by engine heat while the engine has been described in conjunction with specific embodiments thereof it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. In a dump truck having a chassis and a pivotable dump body mounted thereto, wherein the dump body may be heated by the engine exhaust and an exhaust flow diverter valve having a chamber providing a first and second route of flow, a valve means and a biasing means urging said valve means to a position for diverting flow from said first to said second route of flow, the valve means further comprising:
   a ring top tube of cylindrical shape open at the top and bottom thereof, the top portion equipped with an internal land and the bottom portion equipped with an external apertured flange;
   a sleeve stem having a flanged apertured lower portion, a threaded upper portion and a shelf integral with said stem;
   a sealing disk carried on said flanged lower portion of said sleeve stem capable of covering the open bottom of said ring top tube;
   an exhaust sleeve having a port carried by said flanged lower portion of said sleeve stem;
   a seal ring positioned in said ring top tube having a hollow body open at both ends with a landing flange at an upper end thereof, a seal ring stop at the lower end thereof which prohibits said seal ring from being disassociated from said ring top tube and a centrally located alignment tube which may encompass said sleeve stem to maintain concentric alignment between said seal ring and said ring top tube.
   a spring positioned between said external apertured flange of said ring top tube and said landing flange of said seal ring tending to urge said seal ring from said ring top tube.

2. An engine exhaust diverter valve having a chamber providing a first and a second route of flow, an improved valve means for directing flow from said first to said second route of flow comprising:
   a ring top tube opened at both ends thereof having a lower flange integral therewith;
   a seal ring accommodated inside said ring top tube having a seal ring stop and a landing flange;
   a spring carried circumferentially around the ring top tube and the seal ring between the lower flange and landing flange of the ring top tube and the seal ring respectively, normally urging the landing flange away from the lower flange;
   an alignment device carried inside said seal ring;
   a sleeve stem carried inside said alignment device and moveable with said alignment device in said seal ring;
   a sealing disk carried on the lower portion of said sleeve stem preventing the passage of exhaust flow through said seal ring and said ring top tube when seated on said ring top tube;
   an exhaust sleeve having a plurality of ports therethrough carried on said sleeve stem;
   a sleeve receiving cylinder having an open portion for receiving said exhaust sleeve and an exhaust aperture allowing the flow of exhaust when said exhaust sleeve is displaced out of said sleeve receiving cylinder and said sealing disk is blocking the lower opening of said ring top tube.

3. The invention in accordance with claim 2 wherein exhaust flow will pass through said ring top tube upon displacement of said seal ring into said ring top tube as said sealing disk will be unseated from the lower opening of said ring top tube.

4. The invention in accordance with claim 2 wherein said seal ring can move longitudinally on said sleeve stem some distance without displacing said sealing disk from the lower opening of said ring top tube.

* * * * *